(12) United States Patent
Kikuma

(10) Patent No.: US 11,063,351 B2
(45) Date of Patent: Jul. 13, 2021

(54) ANTENNA ANGLE ADJUSTMENT DEVICE, ANTENNA ANGLE ADJUSTMENT METHOD, AND COMMUNICATIONS DEVICE

(71) Applicant: NEC CORPORATION, Tokyo (JP)

(72) Inventor: Tomohiro Kikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 5 days.

(21) Appl. No.: 16/496,155

(22) PCT Filed: Mar. 16, 2018

(86) PCT No.: PCT/JP2018/010509
§ 371 (c)(1),
(2) Date: Sep. 20, 2019

(87) PCT Pub. No.: WO2018/180609
PCT Pub. Date: Oct. 4, 2018

(65) Prior Publication Data
US 2020/0044333 A1    Feb. 6, 2020

(30) Foreign Application Priority Data

Mar. 27, 2017 (JP) .............................. JP2017-060739

(51) Int. Cl.
*H01Q 3/02* (2006.01)
*H04B 17/10* (2015.01)

(52) U.S. Cl.
CPC ............. *H01Q 3/02* (2013.01); *H04B 17/102* (2015.01)

(58) Field of Classification Search
CPC ....................................................... H01Q 3/02

USPC .......................................................... 343/757
See application file for complete search history.

(56) References Cited

FOREIGN PATENT DOCUMENTS

| JP | 04-208722 A | 7/1992 | |
|---|---|---|---|
| JP | 2008-211358 A | 9/2008 | |
| JP | 2009-171205 A | 7/2009 | |
| JP | 2012112738 A * | 6/2012 | ............. G01S 19/14 |
| JP | 2016-039594 A | 3/2016 | |
| JP | 2016-521939 A | 7/2016 | |

OTHER PUBLICATIONS

International Search Report of PCT/JP2018/010509 dated Jun. 5, 2018 [PCT/ISA/210].
Written Opinion of PCT/JP2018/010509 dated Jun. 5, 2018 [PCT/ISA/237].

* cited by examiner

*Primary Examiner* — Graham P Smith
(74) *Attorney, Agent, or Firm* — Sughrue Mion, PLLC

(57) ABSTRACT

Provided are an antenna angle adjustment device, an antenna angle adjustment system, an antenna angle adjustment method, and a communications device, whereby the angle of an antenna can be adjusted to a direction in which direct waves can be more reliably received. A direction information generation unit 41 generates direction information indicating a direction of one antenna from another antenna. A range information generation unit 42 generates range information indicating a range of a main beam of the another antenna. A determination unit 43 determines, based on the range information and the direction information, whether or not the one antenna is in a range indicated by the range information.

6 Claims, 11 Drawing Sheets

ANTENNA ANGLE ADJUSTMENT DEVICE, ANTENNA ANGLE ADJUSTMENT METHOD, AND COMMUNICATIONS DEVICE

CROSS REFERENCE TO RELATED APPLICATIONS

This application is a National Stage of International Application No. PCT/JP2018/010509, filed Mar. 16, 2018, claiming priority to Japanese Patent Application No. 2017-060739, filed Mar. 27, 2017, the contents of all of which are incorporated herein by reference in their entirety.

TECHNICAL FIELD

The present invention relates to an antenna angle adjustment device, an antenna angle adjustment system, an antenna angle adjustment method, and a communication device, for adjusting an antenna angle.

BACKGROUND ART

One wireless communication device and another wireless communication device may be placed in such a way as to be wirelessly communicable with each other. In such a case, both the wireless communication devices are preferably placed in such a way that antennas face each other and thus transmit and receive a direct wave.

PTL 1 describes a method of calculating an angle at which a wave detector is able to detect a radio wave, based on a distance between one wireless communication device and another wireless communication device, an antenna gain of an antenna of each device, and the like, and enabling the antennas to receive a radio wave with maximum received power from each other, by changing an angle of each antenna according to the calculated angle.

PTL 2 describes a device for adjusting an angle of each antenna in such a way that received power of one wireless communication device and received power of another wireless communication device each become maximum.

CITATION LIST

Patent Literature

[PTL 1] Japanese Unexamined Patent Application Publication No. 2008-211358
[PTL 2] Japanese Unexamined Patent Application Publication No. H4-208722

SUMMARY OF INVENTION

Technical Problem

Received power may become maximum by transmission and reception of a reflected wave between an antenna of one wireless communication device and an antenna of another wireless communication device. However, since communication by a reflected wave is unstable, it is preferable that communication is performed by a direct wave.

However, the method described in PTL 1 and the device described in PTL 2 each do not discern whether a received radio wave is a reflected wave or a direct wave, and there is a concern that an angle of an antenna is adjusted to a reception direction of the reflected wave.

Thus, the present invention is intended to provide an antenna angle adjustment device, an antenna angle adjustment system, an antenna angle adjustment method, and a communication device being capable of adjusting an angle of an antenna to a direction in which a direct wave is able to be more reliably received.

Solution to Problem

An antenna angle adjustment device, according to the present invention, includes: electric field strength calculation means for calculating, based on a distance between one antenna and another antenna, electric field strength when a direct wave of a radio wave radiated by the another antenna is received by the one antenna; electric field strength measurement means for measuring the electric field strength of the radio wave radiated by the another antenna, the radio wave being received by the one antenna; and comparison means for comparing a calculation result by the electric field strength calculation means with a measurement result by the electric field strength measurement means.

An antenna angle adjustment system, according to the present invention, includes: the antenna angle adjustment device according to any one of aspects; and
an antenna angle adjustment compliant device including reception-side electric field strength measurement means being connected to the another antenna, for measuring electric field strength of a radio wave radiated by the one antenna, the radio wave being received by the another antenna, and transmission means for transmitting reception-side measurement result information indicating a measurement result by the reception-side electric field strength measurement means, wherein the antenna angle adjustment device comprises reception means for receiving the reception-side measurement result information transmitted by the transmission means.

An antenna angle adjustment device, according to another aspect of the present invention, includes: direction information generation means for generating direction information indicating a direction of one antenna from another antenna; range information generation means for generating range information indicating a range of a main beam of the another antenna; and determination means for determining, based on the range information and the direction information, whether or not the one antenna is in the range indicated by the range information.

An antenna angle adjustment method, according to the present invention, includes: calculating, based on a distance between one antenna and another antenna, electric field strength when a direct wave of a radio wave radiated by the another antenna is received by the one antenna; measuring the electric field strength of the radio wave radiated by the another antenna, the radio wave being received by the one antenna; and comparing the calculated electric field strength with the measured electric field strength.

An antenna angle adjustment method, according to another aspect of the present invention, includes: generating direction information indicating a direction of one antenna from another antenna; generating range information indicating a range of a main beam of the another antenna; and determining, based on the range information and the direction information, whether or not the one antenna is in the range indicated by the range information.

A communication device, according to the present invention, includes: electric field strength calculation means for calculating, based on a distance between one antenna connected to the communication device and another antenna connected to an opposite communication device, electric field strength when a direct wave of a radio wave radiated by the another antenna is received by the one antenna; electric field strength measurement means for measuring the electric field strength of the radio wave radiated by the another antenna, the radio wave being received by the one antenna; and comparison means for comparing a calculation result by the electric field strength calculation means with a measurement result by the electric field strength measurement means.

A communication device, according to another aspect of the present invention, includes: direction information generation means for generating direction information indicating a direction of one antenna connected to the communication device from another antenna connected to an opposite communication device; range information generation means for generating range information indicating a range of a main beam of the another antenna; and determination means for determining, based on the range information and the direction information, whether or not the one antenna is in the range indicated by the range information.

Advantageous Effects of Invention

According to the present invention, an angle of an antenna is able to be adjusted to a direction in which a direct wave can be received.

EXAMPLE EMBODIMENT

Example Embodiment 1

Figure 1:
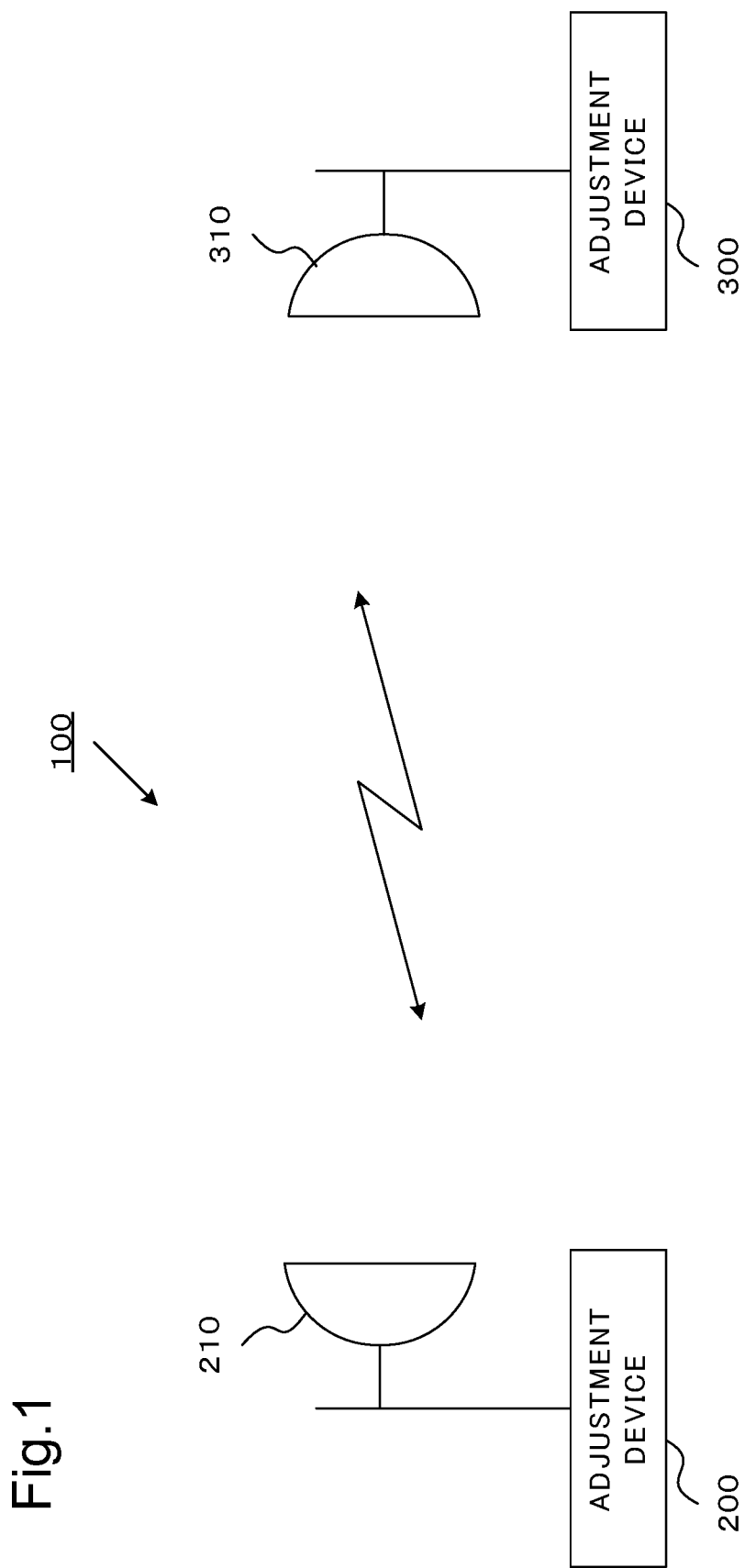
FIG. 1 is a block diagram illustrating a configuration example of an adjustment system in a first example embodiment.

An adjustment system 100 in a first example embodiment is described with reference to the drawings. FIG. 1 is a block diagram illustrating a configuration example of an adjustment system 100 in the first example embodiment. As illustrated in FIG. 1, the adjustment system 100 in the first example embodiment includes an adjustment device 200 and an adjustment device 300. An antenna angle adjustment device is implemented by, for example, the adjustment device 200. Moreover, an antenna angle adjustment compliant device is implemented by, for example, the adjustment device 300. An antenna angle adjustment system is implemented by, for example, the adjustment system 100.

The adjustment device 200 and the adjustment device 300 transmit and receive a signal to and from each other. Note that the adjustment device 200 is provided with an antenna 210. Moreover, the adjustment device 300 is provided with an antenna 310. Note that each of the antennas 210 and 310 is assumed to be an antenna having directivity.

Then, the adjustment device 200 inputs, to the antenna 210, a transmission signal being a signal to be transmitted. The signal input to the antenna 210 is converted into a radio wave and then radiated. The radio wave radiated by the antenna 210 is received by the antenna 310. Then, the antenna 310 converts the received radio wave into a signal (reception signal), and then inputs the signal to the adjustment device 300.

Furthermore, the adjustment device 300 inputs, to the antenna 310, a transmission signal being a signal to be transmitted. The signal input to the antenna 310 is converted into a radio wave and then radiated. The radio wave radiated by the antenna 310 is received by the antenna 210.

Then, the antenna 210 converts the received radio wave into a signal (reception signal), and then inputs the signal to the adjustment device 200.

Note that, a direction of each of the antennas 210 and 310 is adjusted by using the adjustment devices 200 and 300. Then, after the adjustment of the direction, communication in a normal operation is performed by a communication device (not illustrated) connected to each of the antennas 210 and 310.

Figure 2:
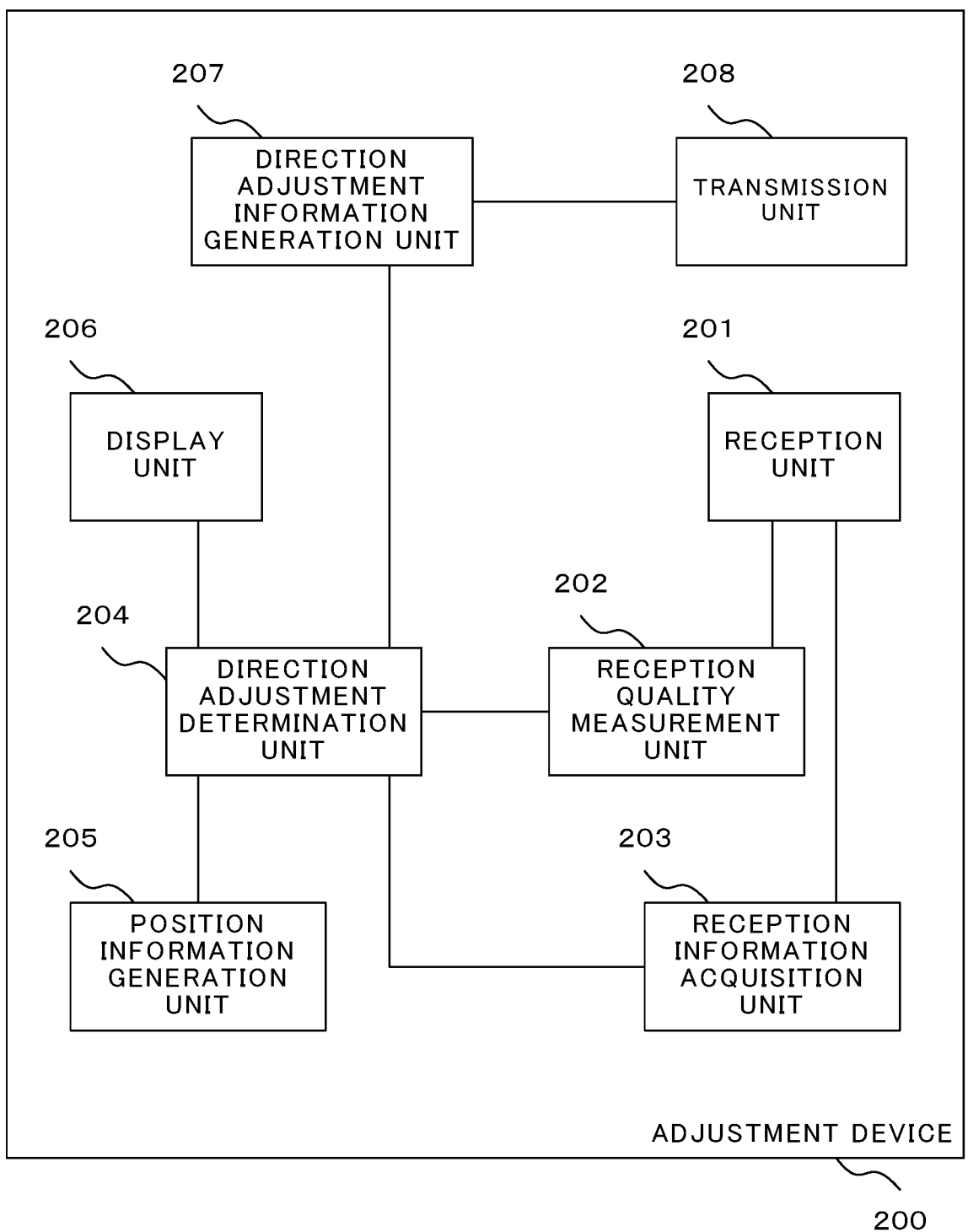
FIG. 2 is a block diagram illustrating a configuration example of an adjustment device in the first example embodiment.

FIG. 2 is a block diagram illustrating a configuration example of the adjustment device 200. As illustrated in FIG. 2, the adjustment device 200 includes a reception unit 201, a reception quality measurement unit (electric field strength measurement means) 202, a reception information acquisition unit 203, a direction adjustment determination unit (electric field strength calculation means, determination means, distance calculation means) 204, a position information generation unit 205, a display unit (measurement result information output means, determination result information output means) 206, a direction adjustment information generation unit 207, and a transmission unit (output means) 208.

The antenna 210 is connected to the reception unit 201, and a signal (reception signal) received by the antenna 210 is input to the reception unit 201. Then, the reception unit 201 inputs the input reception signal to the reception quality measurement unit 202 and the reception information acquisition unit 203.

The reception quality measurement unit 202 measures quality of the input reception signal. Specifically, the reception quality measurement unit 202 measures electric field strength of the input reception signal.

The reception quality measurement unit 202 generates reception quality information indicating a measurement result of quality of the reception signal. The reception quality measurement unit 202 inputs the generated reception quality information to the direction adjustment determination unit 204.

The reception information acquisition unit 203 acquires, based on the input reception signal, reception position information and measurement result information indicated by the reception signal. Note that the reception information acquisition unit 203 may be configured in such a way as to acquire the reception position information and the measurement result information included in information (e.g., direction adjustment information generated by the adjustment device 300) indicated by the reception signal. The reception information acquisition unit 203 inputs the acquired reception position information and measurement result information to the direction adjustment determination unit 204. Note that reception position information is information indicating a position where an antenna of an opposite adjustment device (in the present example, the antenna 310 of the adjustment device 300) is located. Note that reception position information may be information indicating a position where an opposite adjustment device (in the present example, the adjustment device 300) is located. Moreover, measurement result information is information indicating a value (i.e., a value of electric field strength on a reception side) of electric field strength of a transmission signal transmitted by the adjustment device 200 via the antenna 210, received by the antenna 310, and then input to the adjustment device 300. Further, it is assumed that a reception signal is a signal in which a carrier wave is modulated with reception position information and measurement result information generated by the adjustment device 300.

The position information generation unit 205 generates transmission position information indicating a position where the antenna 210 connected to the adjustment device 200 is located. Note that, for example, in such a case that a distance between a position where the antenna 210 is located and a position where the adjustment device 200 is located is sufficiently short, the position information generation unit 205 may generate transmission position information indicating a position where the adjustment device 200 is located. The position information generation unit 205 generates transmission position information, based on, for example, a signal received from a satellite of a satellite positioning system such as a global positioning system (GPS). Then, the position information generation unit 205 inputs the generated transmission position information to the direction adjustment determination unit 204.

The direction adjustment determination unit 204 calculates a distance between the antenna 210 and the antenna 310, based on a position indicated by the input transmission position information, and a position indicated by the input reception position information. Then, the direction adjustment determination unit 204 calculates theoretical received power Prx[dBm], based on the calculated distance.

Herein, the theoretical received power Prx is able to be calculated based on, for example, the following Equation (1).

$$Prx=Ptx-Lt+Gt-L+Gr-Lr \quad (1)$$

Ptx[dBm] indicates transmitted power which is power of a signal input to the antenna 310 being a transmission-side antenna. Lt[dB] indicates a transmission power supply loss in the antenna 310. Gt[dB] is a gain of the antenna 310. L[dB] is a propagation loss. Gr[dB] is a gain of the antenna 210. Lr[dB] is a reception power supply loss in the antenna 210.

Herein, it is assumed that Ptx, Lt, Gt, Gr, and Lr are each a preset value, and are prestored in a storage means (not illustrated) of the adjustment device 200.

Then, the propagation loss L[dB] is able to be calculated based on, for example, the following Equation (2).

$$L=10\ \log(4\pi D/\lambda)^2 \quad (2)$$

Herein, a distance between the antenna 210 and the antenna 310 calculated by the direction adjustment determination unit 204 is applied to D[m]. λ[m] indicates a wavelength of a reception signal. Note that a frequency of a reception signal is assumed to be predetermined. Accordingly, a value of λ is also predetermined. Note that a value of λ is also assumed to be prestored in the storage means of the adjustment device 200.

Thus, the direction adjustment determination unit 204 designates, as D, a value of the calculated distance between the antenna 210 and the antenna 310, and calculates a propagation loss L by use of Equation (2), based on the value of D and a value of λ stored in the storage means. Then, the direction adjustment determination unit 204 calculates a value of the theoretical received power Prx by use of Equation (1), based on the calculated value of L, and each value (a value of Ptx, a value of Lt, a value of Gt, a value of Gr, and a value of Lr) stored in the storage means.

Moreover, the direction adjustment determination unit 204 calculates a reception side difference value being a difference between the calculated value of the theoretical received power Prx, and a value of electric field strength indicated by measurement result information input by the reception information acquisition unit 203.

Furthermore, the direction adjustment determination unit 204 calculates a transmission side difference value being a difference between the calculated value of the theoretical received power Prx, and a value of electric field strength indicated by reception quality information input by the reception quality measurement unit 202. Note that, in the present invention, a reception side difference value and a transmission side difference value may be calculated by converting a value (generally, a value indicated with a unit [dBμV/m] or the like) of electric field strength indicated by the measurement result information and the reception quality information into a value indicated with a unit [dBm] for the theoretical received power Prx. Alternatively, the reception side difference value and the transmission side difference value may be calculated by converting a value of the theoretical received power Prx indicated with the unit [dBm] into a value indicated with the unit [dBμV/m] for electric field strength of the measurement result information and the reception quality information.

The direction adjustment determination unit 204 calculates a comparison difference value being the calculated difference between a value of the reception side difference value and a value of the transmission side difference value.

Furthermore, the direction adjustment determination unit 204 generates comparison result information (determination result information) indicating a comparison result by comparing the reception side difference value, the transmission side difference value, and the comparison difference value with a predetermined threshold value. Then, the direction adjustment determination unit 204 inputs the comparison result information to the display unit 206. Moreover, the direction adjustment determination unit 204 inputs the transmission position information input by the position information generation unit 205 to the direction adjustment information generation unit 207. Further, the direction adjustment determination unit 204 inputs, to the display unit 206 and the direction adjustment information generation unit 207, the reception quality information input by the reception quality measurement unit 202.

The display unit 206 displays, on a display means (not illustrated), a screen suited to comparison result information, for example. Moreover, the display unit 206 displays, on the display means, a screen suited to reception quality information, for example. Then, a direction of the antenna 210 is adjusted suitably to a screen displayed on the display means, by a manager or the like of the adjustment device 200. Note that the adjustment device 200 may include a display means.

The direction adjustment information generation unit 207 generates direction adjustment information including transmission position information and reception quality information input by the direction adjustment determination unit 204, and then inputs the direction adjustment information to the transmission unit 208.

The transmission unit 208 generates a transmission signal in which a carrier wave is modulated with the direction adjustment information input by the direction adjustment information generation unit 207, and then inputs the transmission signal to the antenna 210. The transmission signal is transmitted by the antenna 210.

A configuration of the adjustment device 300 is similar to the configuration of the adjustment device 200, and therefore, a description is omitted.

Note that, the reception unit 201, the reception quality measurement unit 202, and the transmission unit 208 are each implemented by, for example, a communication module. The reception information acquisition unit 203 is implemented by, for example, a demodulation means. The position information generation unit 205 is implemented by, for example, a position information generation module. The direction adjustment determination unit 204, the display unit 206, and the direction adjustment information generation unit 207 are each implemented by, for example, a central processing unit (CPU) and a plurality of circuits executing processing under program control.

A communication device which uses the antenna 210 in normal operation is connected to the antenna 210, and the reception unit 201 and the transmission unit 208 may be each implemented by the communication device.

Figure 3:
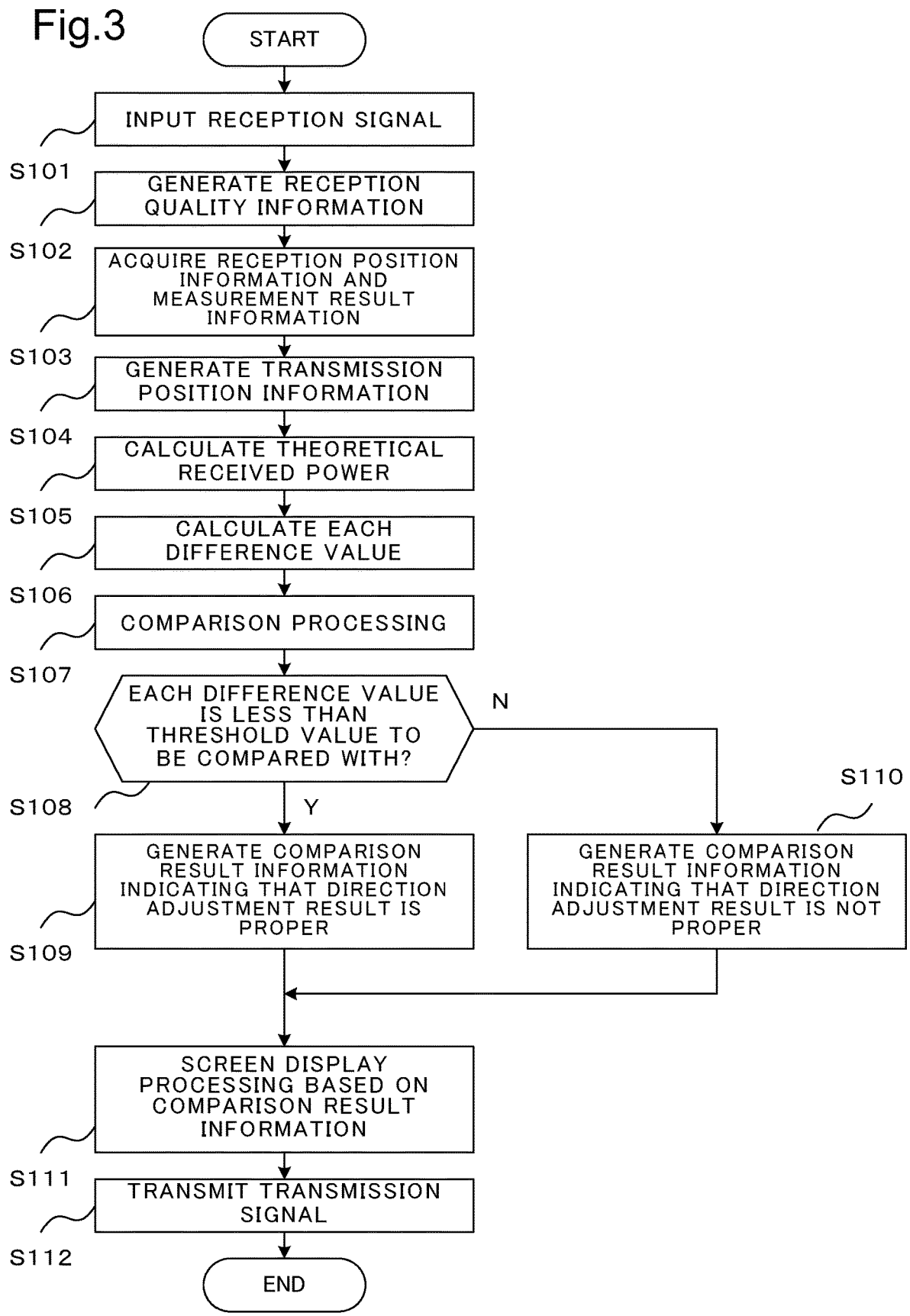
FIG. 3 is a flowchart illustrating operation of the adjustment device in the first example embodiment.

Next, operation of the adjustment device 200 is described. FIG. 3 is a flowchart illustrating operation of the adjustment device 200.

In the adjustment device 200, a signal (reception signal) transmitted by the antenna 310 of the opposite adjustment device 300 and received by the antenna 210 is input to the reception unit 201 (step S101). Then, the reception unit 201 inputs the input reception signal to the reception quality measurement unit 202 and the reception information acquisition unit 203.

The reception quality measurement unit 202 measures quality of the reception signal. Then, the reception quality measurement unit 202 generates reception quality information indicating a measurement result of quality of the reception signal (step S102). The reception quality measurement unit 202 inputs the generated reception quality information to the direction adjustment determination unit 204.

The reception information acquisition unit 203 acquires, based on the reception signal, reception position information and measurement result information indicated by the reception signal (step S103). Specifically, the reception information acquisition unit 203 acquires the reception position information and the measurement result information by, for example, applying predetermined demodulation processing to the reception signal in which a carrier wave is modulated with the reception position information and the measurement result information.

Then, the reception information acquisition unit 203 inputs, to the direction adjustment determination unit 204, the reception position information and the measurement result information acquired in the processing at step S103.

Further, the position information generation unit 205 generates transmission position information (step S104). The position information generation unit 205 inputs the generated transmission position information to the direction adjustment determination unit 204.

Based on the input reception position information and transmission position information, the direction adjustment determination unit 204 calculates a distance D between the antenna 210 and the antenna 310. Then, based on the calculated distance D, the direction adjustment determination unit 204 calculates a propagation loss L between the antenna 210 and the antenna 310 by use of the Equation (2) described above. Based on the calculated propagation loss L, the direction adjustment determination unit 204 calculates theoretical received power Prx by use of the Equation (1) described above (step S105).

Then, the direction adjustment determination unit 204 calculates a reception side difference value, a transmission side difference value, and a comparison difference value, based on a value of the theoretical received power Prx calculated in the processing at step S105 (step S106).

The direction adjustment determination unit 204 compares, with a predetermined threshold value, the reception side difference value, the transmission side difference value, and the comparison difference value calculated in the processing at step S106 (step S107).

Note that, threshold values compared with the reception side difference value, the transmission side difference value, and the comparison difference value may be values different from one another. Moreover, for example, a configuration may be provided in such a way that the reception side difference value and the transmission side difference value are compared with the same threshold value, and the comparison difference value is compared with a threshold value being different from the threshold value to be compared with the reception side difference value and the transmission side difference value. Note that, when communication between the antenna 210 and the antenna 310 is performed by frequency division duplex (FDD), a degree of correlation between a radio wave propagation status in communication in one direction of transmission from the antenna 210 side to the antenna 310 side and a radio wave propagation status in communication in another direction of transmission from the antenna 310 side to the antenna 210 side is greater, as a variance between a frequency used for the communication in the one direction and a frequency used for the communication in the another direction is smaller. Thus, a threshold value suited to magnitude of the variance between the frequency used for the communication in the one direction and the frequency used for the communication in the another direction may be set in such a way that the threshold value is used for comparison with the comparison difference value. Specifically, a greater threshold value may be used for the comparison with the comparison difference value when the variance between the frequency used for the communication in the one direction and the frequency used for the communication in the another direction is greater, and a smaller threshold value may be used for the comparison with the comparison difference value when the variance is smaller. When the variance between the frequency used for the communication in the one direction and the frequency used for the communication in the another direction is smaller, a degree of correlation between a radio wave propagation status in the communication in the one direction and a radio wave propagation status in the communication in the another direction is greater, and therefore, it is considered that the comparison difference value becomes smaller. Thus, it is possible to determine, with high accuracy, propriety of direction adjustment of the antennas 210 and 310 by comparing the smaller threshold value with the comparison difference value.

When the reception side difference value, the transmission side difference value, and the comparison difference value are all less than a threshold value to be compared with (Y in step S108), the direction adjustment determination unit 204 generates comparison result information indicating that a direction adjustment result of the antenna is proper (step S109). Then, the direction adjustment determination unit 204 inputs the generated comparison result information to the display unit 206, and then shifts to processing at step S111. Moreover, when any one of the reception side difference value, the transmission side difference value, and the comparison difference value is equal to or more than the threshold value to be compared with (N in step S108), the direction adjustment determination unit 204 generates comparison result information indicating that a direction adjustment result of the antenna is not proper (step S110). Then, the direction adjustment determination unit 204 inputs the generated comparison result information to the display unit 206, and then shifts to processing at step S111.

In the processing at step S111, the display unit 206 displays, on the display means, a screen based on the comparison result information input by the direction adjustment determination unit 204 in the processing at steps S109 and S110 (step S111).

Specifically, for example, when the direction adjustment determination unit 204 inputs comparison result information in the processing at step S109, the display unit 206 displays, on the display means, a screen indicating that an angle at which the antenna 210 is directed and an angle at which the antenna 310 is directed are proper, based on the comparison result information, in the processing at step S111.

Furthermore, for example, when the direction adjustment determination unit 204 inputs comparison result information in the processing at step S110, the display unit 206 displays, on the display means, a screen indicating that at least one of an angle at which the antenna 210 is directed and an angle at which the antennas 310 is directed is not proper, based on the comparison result information, in the processing at step S111.

Further, the direction adjustment determination unit 204 inputs, to the direction adjustment information generation unit 207, the transmission position information input by the position information generation unit 205, and the reception quality information input by the reception quality measurement unit 202. The direction adjustment information generation unit 207 generates direction adjustment information including the transmission position information and the reception quality information input by the direction adjustment determination unit 204, and then inputs the direction adjustment information to the transmission unit 208.

The transmission unit 208 generates a transmission signal in which a carrier wave is modulated with the direction adjustment information input by the direction adjustment information generation unit 207, and then inputs the transmission signal to the antenna 210. The transmission signal is transmitted by the antenna 210 (step S112).

According to the present example embodiment, a difference is calculated between a value of theoretical received power based on a distance between the antenna 210 connected to the one adjustment device 200 and the antenna 310 connected to the other adjustment device 300, and a value of electric field strength of an actually received radio wave. Herein, a propagation distance of a direct wave between the antenna 210 and the antenna 310 is equivalent to the calculated distance between the antenna 210 connected to the one adjustment device 200 and the antenna 310 connected to the other adjustment device 300. Therefore, when a direct wave is transmitted and received between the antenna 210 and the antenna 310, a difference between a value of theoretical received power based on a distance between the antenna 210 connected to the one adjustment device 200 and the antenna 310 connected to the other adjustment device 300, and a value of electric field strength of an actually received radio wave is to be sufficiently small. Accordingly, based on a difference between a value of theoretical received power based on a distance between the antenna 210 connected to the one adjustment device 200 and the antenna 310 connected to the other adjustment device 300, and a value of electric field strength of an actually received radio wave, it is possible to appropriately determine whether the antenna 210 and the antenna 310 transmit and receive a direct wave or a reflected wave. Moreover, by comparing a comparison difference value with a preset threshold value, in addition to comparing a reception side difference value and a transmission side difference value with a preset threshold value, it is possible to more appropriately determine whether the antenna 210 and the antenna 310 transmit and receive a direct wave or a reflected wave.

Then, it is possible to determine whether an angle at which the antenna 210 connected to the one adjustment device 200 is directed and an angle at which the antenna 310 connected to the other adjustment device 300 is directed are proper.

Therefore, an angle at which the antenna 210 connected to the one adjustment device 200 is directed and an angle at which the antenna 310 connected to the other adjustment device 300 are able to be each adjusted to a more appropriate angle.

Although the description is given assuming that the configuration of the adjustment device 300 is similar to the configuration of the adjustment device 200 in the present example, the configuration of the adjustment device 300 does not necessarily need to be similar to the configuration of the adjustment device 200. Specifically, the adjustment device 300 may include at least an element (a reception-side electric field strength measurement means of the antenna angle adjustment compliant device) equivalent to the reception quality measurement unit 202 in the adjustment device 200, and an element (a transmission means of the antenna angle adjustment compliant device) equivalent to the transmission unit 208 in the adjustment device 200, and may be able to transmit angle adjustment information indicating quality of a reception signal.

Figure 4:
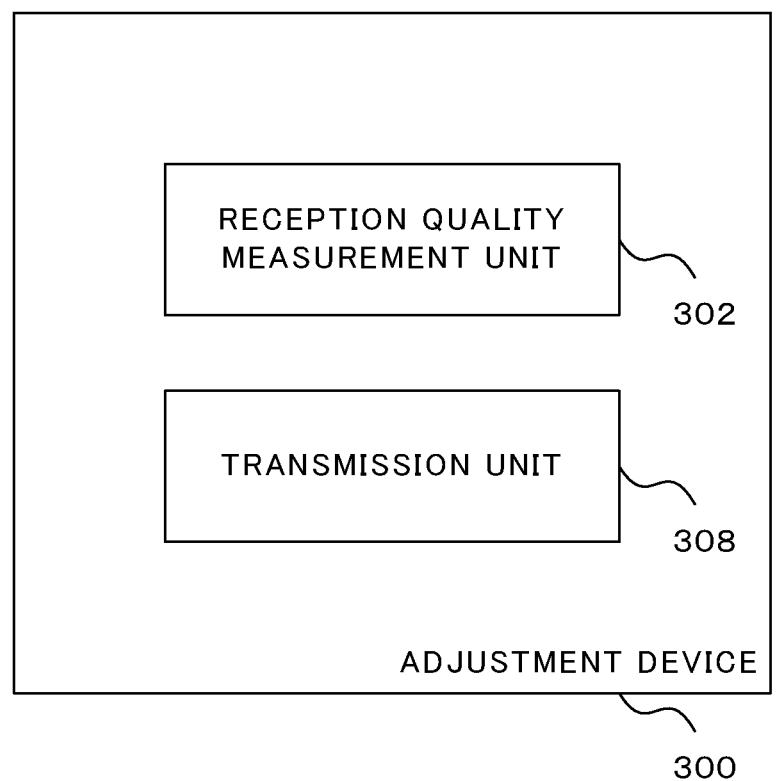
FIG. 4 is a block diagram illustrating another configuration example of the adjustment device.

FIG. 4 is a block diagram illustrating a configuration example of such an adjustment device 300. In the example illustrated in FIG. 4, the adjustment device 300 includes a reception quality measurement unit 302 equivalent to the reception quality measurement unit 202, and a transmission unit 308 equivalent to the transmission unit 208 in the adjustment device 200.

Such a configuration is able to make the configuration of the adjustment device 300 simpler, and reduce weight and cost of the adjustment device 300.

Example Embodiment 2

The adjustment device 200 in the first example embodiment determines whether or not an angle at which the antenna 210 is directed and an angle at which the antenna 310 is directed are proper, by observing a difference between a value of theoretical received power based on a distance between the antenna 210 and the antenna 310, and a value of electric field strength of an actually received radio wave. In contrast, an adjustment device 220 in a second example embodiment determines whether or not an angle at which an antenna 310 is directed is proper, based on whether or not an antenna 210 is located within a range of beam width of radio wave radiated by the antenna 310.

Figure 5:
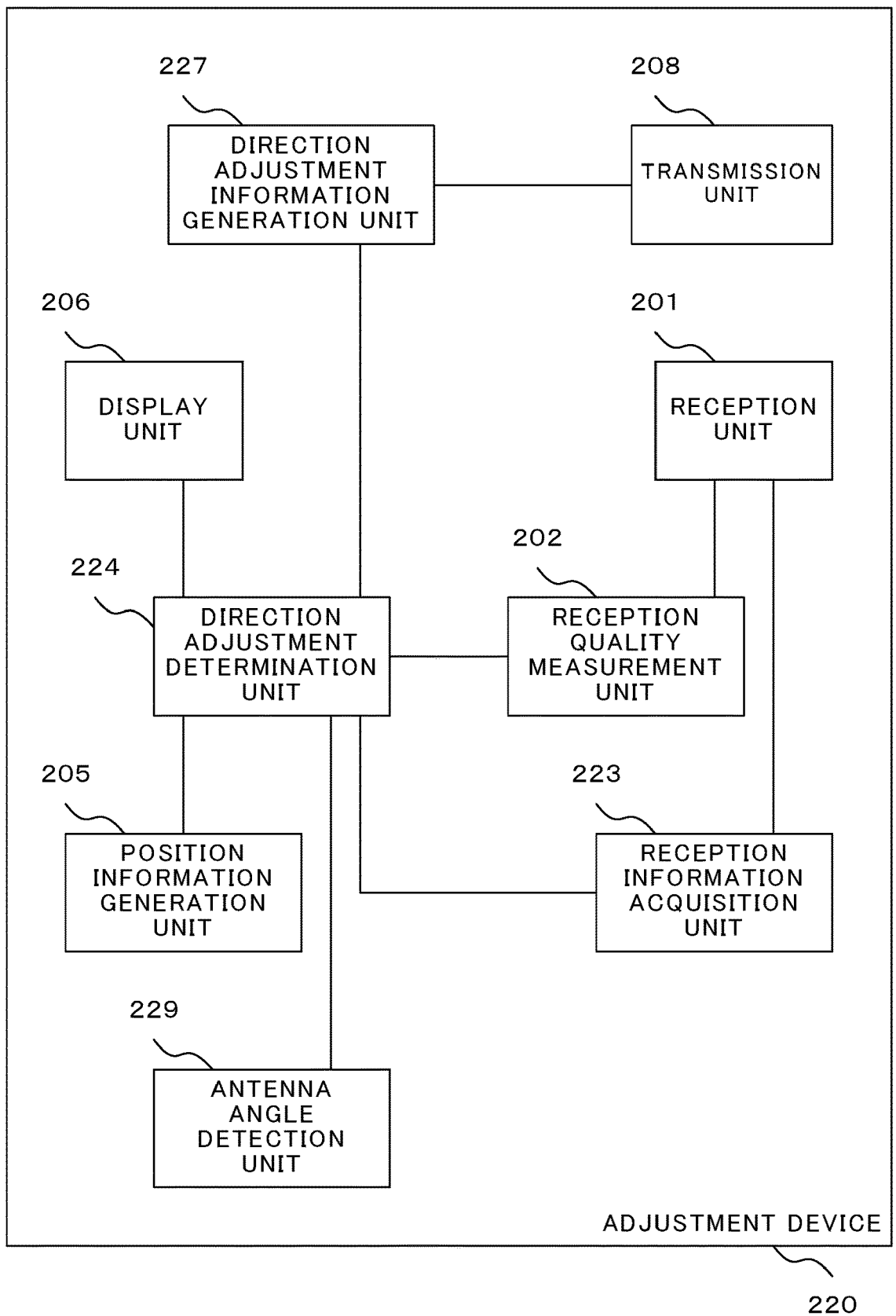
FIG. 5 is a block diagram illustrating a configuration example of an adjustment device in a second example embodiment.

FIG. 5 is a block diagram illustrating a configuration example of the adjustment device 220 in the second example embodiment. The configuration of the adjustment device 220 in the second example embodiment illustrated in FIG. 5 is different from the configuration of the adjustment device 200 in the first example embodiment in including a reception information acquisition unit 223, a direction adjustment determination unit 224, a direction adjustment information generation unit 227, and an antenna angle detection unit 229. Other components are similar to the components of the adjustment device 200 in the first example embodiment illustrated in FIG. 2, and therefore, the same reference sign as that in FIG. 2 is given to the corresponding component, and a description is omitted.

The antenna angle detection unit 229 is implemented by, for example, an angle sensor. The reception information acquisition unit 223, the direction adjustment determination unit 224, and the direction adjustment information generation unit 227 are each implemented by, for example, a CPU and a plurality of circuits executing processing under program control.

In the present example embodiment, the antenna angle detection unit 229 measures an elevation of a direction in which a value of a gain of the antenna 210 is greatest, as an angle of a direction in which the antenna 210 connected to the adjustment device 220 is directed. Then, the antenna angle detection unit 229 generates angle information indicating a measurement result. Note that, an elevation is assumed to be at 0° in a horizontal direction, and an angle directed higher than the horizontal direction is assumed to be represented by a positive value, whereas an angle (i.e., a depression) directed lower than the horizontal direction is assumed to be represented by a negative value.

Figure 6:
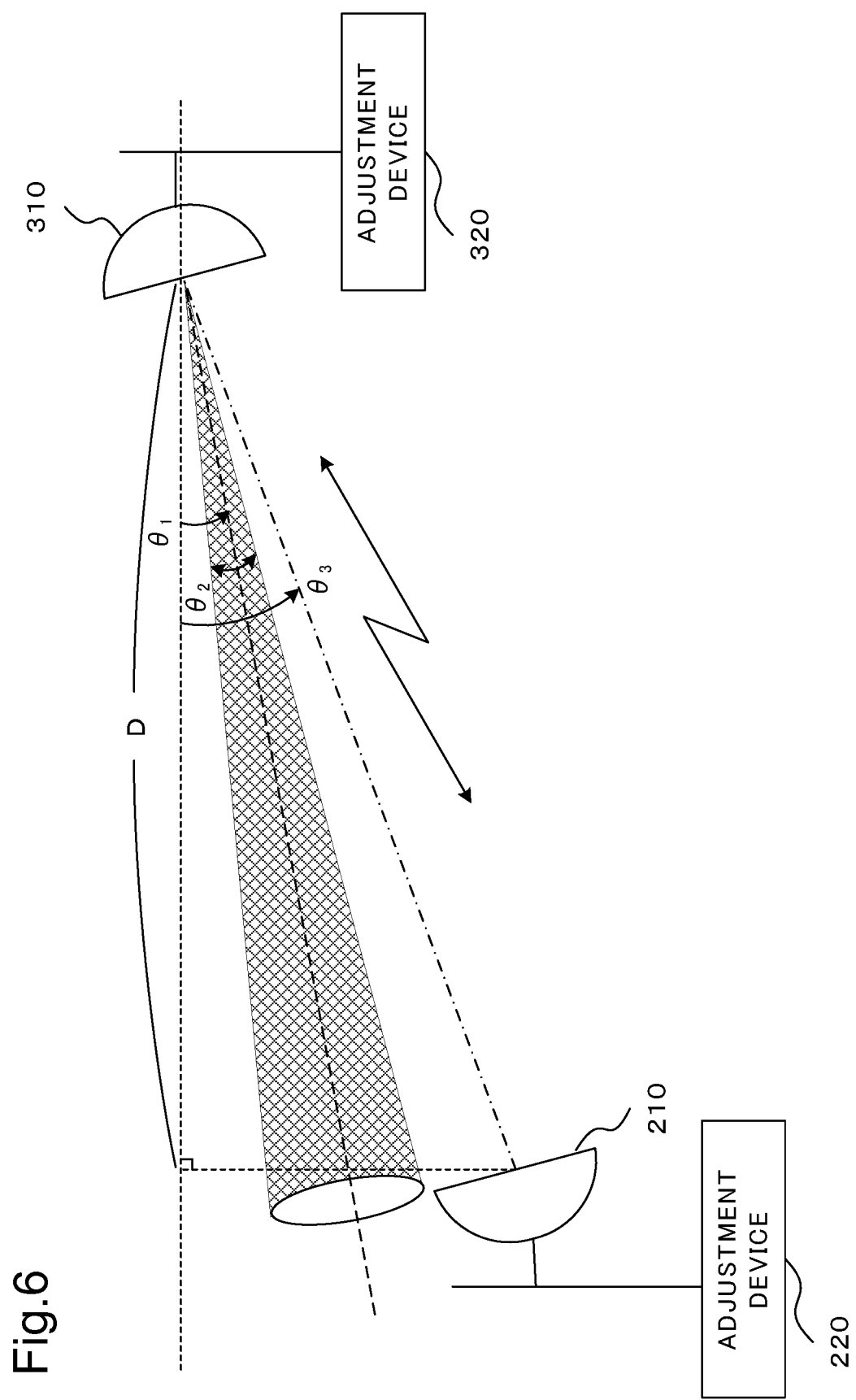
FIG. 6 is an explanatory diagram illustrating a position relation between one antenna and another antenna in the second example embodiment.

FIG. 6 is an explanatory diagram illustrating a position relation between the antenna 210 and the antenna 310 in the present example embodiment. As illustrated in FIG. 6, the antenna 310 is placed in such a way as to be directed in a direction of an elevation of $-\theta_1°$ (a depression of) $\theta_1°$ to a horizon (indicated by a dotted line in FIG. 6). In FIG. 6, a direction in which the antenna 310 is directed is indicated by a broken line. Note that a direction in which the antenna 310 is directed is a central line of a main beam of the antenna 310. Then, a range of the main beam is indicated by hatching in FIG. 6. Note that, a range of a main beam refers to, for example, a region of a range of an angle width (half value width) of a range of a gain from a value of a maximum gain to half power (i.e., −3 [dB]) of the maximum gain, in an angle characteristic of the antenna 310. In the present example, it is assumed that a range of a main beam is a range of $\theta_2°$ around the central line. Moreover, it is assumed that the antenna 210 is located in a direction of an elevation of $-\theta_3°$ (a depression of $\theta_3°$ to a horizontal direction of the antenna 310. Note that a storage means (not illustrated) of the adjustment device 220 stores main beam information indicating that an angle according to a range of a main beam of the antenna 310 is $\theta_2°$.

The reception information acquisition unit 223 acquires, based on an input reception signal, reception position information and measurement result information indicated by the reception signal. Note that the reception information acquisition unit 223 may be configured in such a way as to acquire the reception position information and the measurement result information included in information (e.g., direction adjustment information generated by an adjustment device 320) indicated by the reception signal. The reception information acquisition unit 223 inputs the acquired reception position information and measurement result information to the direction adjustment determination unit 224. Note that, similarly to the reception position information in the first example embodiment, reception position information in the present example embodiment is information indicating a position where an antenna (in the present example, the antenna 310 of the adjustment device 320) of an opposite adjustment device is located. Moreover, measurement result information in the present example embodiment is information indicating an angle at which an antenna (in the present example, the antenna 310 of the adjustment device 320) of an opposite adjustment device is directed. In the present example embodiment, it is assumed that measurement result information indicates $-\theta_1°$ (refer to FIG. 6). Further, it is assumed that a reception signal is a signal in which a carrier wave is modulated with reception position information and measurement result information generated by the adjustment device 320.

Based on a position of the antenna 310 indicated by reception position information input by the reception information acquisition unit 223, and a position, indicated by transmission position information input by the position information generation unit 205, at which the antenna 210 is located, the direction adjustment determination unit 224 calculates an angle (i.e., a value of $\theta_3°$ of an elevation at which the antenna 210 is located to the horizontal direction of the antenna 310. Information indicating the value of $\theta_3°$ is equivalent to direction information.

Then, the direction adjustment determination unit 224 determines, based on a calculation result of the value of $\theta_3°$, whether or not the antenna 210 is located within a range of a main beam of the antenna 310. Specifically, the direction adjustment determination unit 224 determines whether or not, for example, a relation among $\theta_1°$ being an angle, indicated by measurement result information, at which the antenna 310 is directed, $\theta_2°$ stored in a storage means, and calculated $\theta_3°$ satisfies the following Equation (3).

$$\theta_1 - \theta_2/2 \leq \theta_3 \leq \theta_1 + \theta_2/2 \tag{3}$$

Note that information indicating a range of a value of $\theta_3$ in Equation (3) is equivalent to range information.

Specifically, for example, in a case where $\theta_3=-25$ to $-35°$ when $\theta_1=-30°$ (a depression of 30°), and $\theta_2=10°$, i.e., in a case where the antenna 210 is located in a direction of an elevation of −25 to −35° (a depression of 25 to 35°) to the horizontal direction of the antenna 310, the direction adjustment determination unit 224 determines that the antenna 210 is located within the range of the main beam of the antenna 310.

Then, the direction adjustment determination unit 224 inputs comparison result information according to a determination result to the direction adjustment information generation unit 227. Moreover, the direction adjustment determination unit 224 inputs, to the direction adjustment information generation unit 227, transmission position information input by the position information generation unit 205. The direction adjustment determination unit 224 inputs, to the direction adjustment information generation unit 227, angle information input by the antenna angle detection unit 229, as measurement result information.

Figure 7:
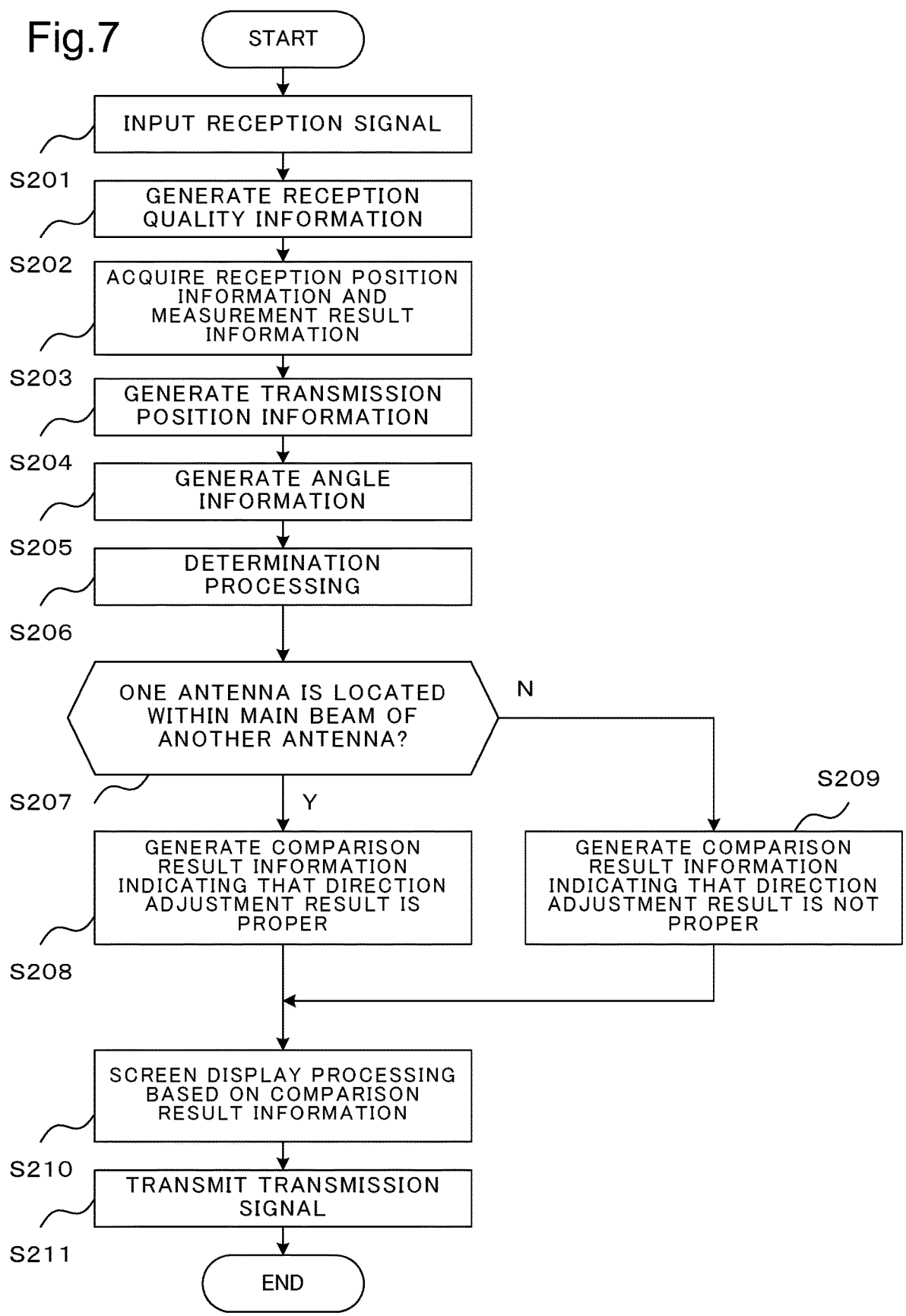
FIG. 7 is an explanatory diagram illustrating operation of the adjustment device in the second example embodiment.

Next, operation of 220 in the present example embodiment is described. FIG. 7 is a flowchart illustrating the operation of the adjustment device 220 in the present example embodiment.

In the adjustment device 220, a signal (reception signal) transmitted by the antenna 310 of an opposite adjustment device 300 and received by the antenna 210 is input to the reception unit 201 (step S201). Then, the reception unit 201 inputs the input reception signal to a reception quality measurement unit 202 and the reception information acquisition unit 223.

The reception quality measurement unit 202 measures quality of the reception signal. Then, the reception quality measurement unit 202 generates reception quality information indicating a measurement result of quality of the reception signal (step S202). The reception quality measurement unit 202 inputs the generated reception quality information to the direction adjustment determination unit 224.

The reception information acquisition unit 223 acquires, based on a reception signal, reception position information and measurement result information indicated by the reception signal (step S203). Specifically, the reception information acquisition unit 223 acquires the reception position information and the measurement result information by, for example, applying predetermined demodulation processing to the reception signal in which a carrier wave is modulated with the reception position information and the measurement result information.

Then, the reception information acquisition unit 223 inputs, to the direction adjustment determination unit 224, the reception position information and the measurement result information acquired in the processing at step S203.

Further, the position information generation unit 205 generates transmission position information (step S204). The position information generation unit 205 inputs the generated transmission position information to the direction adjustment determination unit 224.

The antenna angle detection unit 229 generates angle information indicating an angle of a direction in which the antenna 210 is directed (step S205). The antenna angle detection unit 229 inputs the generated angle information to the direction adjustment determination unit 224.

Based on main beam information, the input reception position information, measurement result information, and transmission position information, the direction adjustment determination unit 224 determines whether or not the antenna 210 is located within a range of a main beam of the antenna 310 (step S206).

When determining that the antenna 210 is located within the range of the main beam of the antenna 310 (Y in step S207), the direction adjustment determination unit 224 generates comparison result information indicating that a direction adjustment result of the antenna is proper (step S208). Then, the direction adjustment determination unit 224 inputs the generated comparison result information to a display unit 206, and then shifts to processing at step S210. Moreover, when determining that the antenna 210 is not located within the range of the main beam of the antenna 310 (N in step S207), the direction adjustment determination unit 224 generates comparison result information indicating that a direction adjustment result of the antenna is not proper (step S209). Then, the direction adjustment determination unit 224 inputs the generated comparison result information to the display unit 206, and then shifts to processing at step S210.

In the processing at step S210, the display unit 206 displays, on a display means, a screen based on the comparison result information input by the direction adjustment determination unit 224 in the processing at steps S208 and S209 (step S210).

Specifically, for example, when the direction adjustment determination unit 224 inputs comparison result information in the processing at step S208, the display unit 206 displays, on the display means, a screen indicating that an angle at which the antenna 310 is directed is proper, based on the comparison result information, in the processing at step S210.

Moreover, for example, when the direction adjustment determination unit 224 inputs comparison result information in the processing at step S209, the display unit 206 displays, on the display means, a screen indicating that an angle at which the antenna 310 is directed is not proper, based on the comparison result information, in the processing at step S210.

Further, the direction adjustment determination unit 224 inputs, to the direction adjustment information generation unit 227, comparison result information according to a determination result. Moreover, the direction adjustment determination unit 224 inputs, to the direction adjustment information generation unit 227, transmission position information input by the position information generation unit 205. The direction adjustment determination unit 224 inputs, to the direction adjustment information generation unit 227, angle information input by the antenna angle detection unit 229, as measurement result information.

The direction adjustment information generation unit 227 generates direction adjustment information including the transmission position information and the comparison result information input by the direction adjustment determination unit 224, and the measurement result information input by the antenna angle detection unit 229, and then inputs the direction adjustment information to the transmission unit 208.

The transmission unit 208 generates a transmission signal in which a carrier wave is modulated with the direction adjustment information input by the direction adjustment information generation unit 227, and then inputs the transmission signal to the antenna 210. The transmission signal is transmitted by the antenna 210 (step S211).

Note that, the adjustment device 320 in the present example embodiment has a configuration similar to, for example, that of the adjustment device 220. Then, based on a transmission signal transmitted in the processing at step S211 exemplified in FIG. 7, the adjustment device 320 performs processing equivalent to the processing at steps S201 to S211 exemplified in FIG. 7, and determines whether or not the antenna 310 is located within a range of a main beam of the antenna 210.

According to the present example embodiment, whether or not one antenna (e.g., the antenna 210) is located within a range of a main beam of another antenna (e.g., the antenna 310) is determined. Herein, when the one antenna and the another antenna each transmit and receive a direct wave, the one antenna is located within the range of the main beam of the another antenna, and the another antenna is located within a range of a main beam of the one antenna. Thus, as a consequence of the determination, whether or not the one antenna and the another antenna each transmit and receive a direct wave is able to be determined.

Furthermore, according to the present example embodiment, measurement result information is transmitted to an opposite antenna in the processing at step S211, and therefore, a manager can be informed of whether or not adjustment of an antenna is proper via an adjustment device connected to the opposite antenna.

Note that, in the present second example embodiment, whether or not one antenna (e.g., the antenna 210) is located within a range of a main beam of another antenna (e.g., the antenna 310) is determined based on an angle (direction) at which the another antenna is directed, and an angle width of the main beam of the another antenna.

However, whether or not one antenna (e.g., the antenna 210) is located within a range of a main beam of another antenna (e.g., the antenna 310) may be determined by another method. Specifically, the antenna 210 is located under the antenna 310 as illustrated in FIG. 6, and in this case, assuming that a distance between the antenna 310 and the antenna 210 on a horizontal plane is D, an upper end of a range of a main beam of the antenna 310 is indicated by D tan($\theta_1-(\theta_2/2)$), and a lower end of a range of a main beam of the antenna 310 is indicated by D tan($\theta_1+(\theta_2/2)$). Then, assuming that a depression of a direction directed to the antenna 210 from the antenna 310 is $\theta_3$, it is possible to determine that the antenna 210 is located within the range of the main beam of the antenna 310 when each of the antennas 210 and 310 is located at such height that a relation of |D tan($\theta_1-(\theta_2/2)$)|≤|D tan($\theta_3$)|≤|D tan($\theta_1+(\theta_2/2)$)| is satisfied. In this instance, it is assumed that the antenna 310 is located in a direction (azimuth) in which the antenna 210 is directed on a horizontal plane. Note that, the distance D is assumed to be calculated, for example, by the direction adjustment determination unit 224, based on transmission position information and reception position information, and assumed to be a value being sufficiently great for a size of each of the antennas 210 and 310. In addition, $\theta_2$ is indicated by main beam information.

Example Embodiment 3

Figure 8:
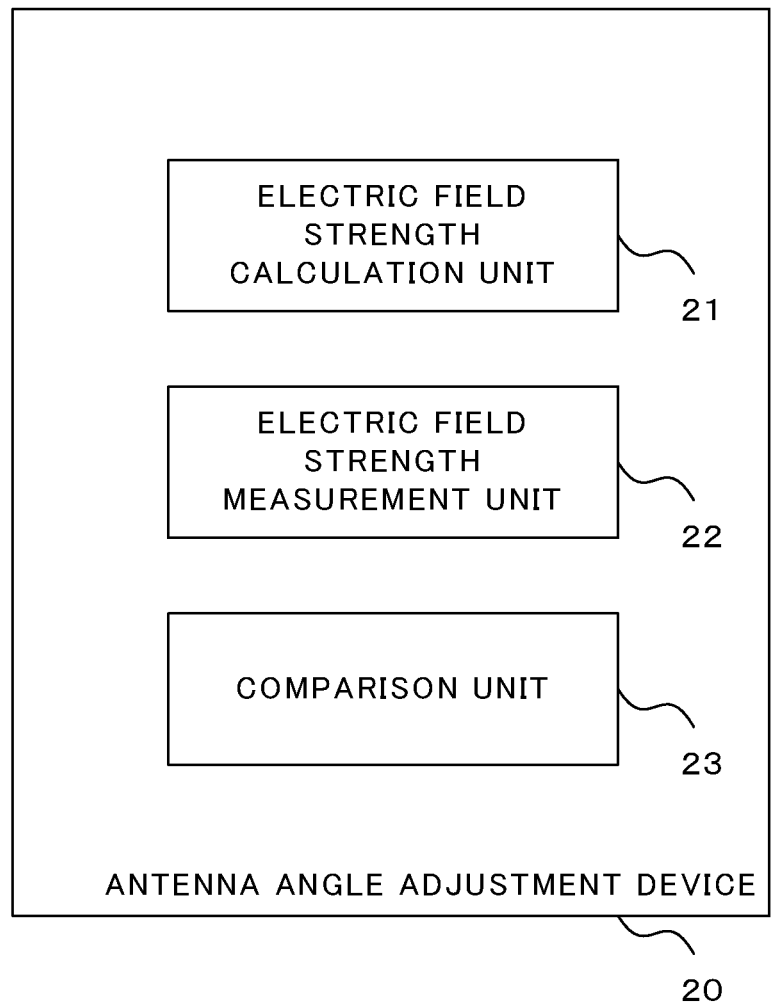
FIG. 8 is a block diagram illustrating a configuration example of an antenna angle adjustment device in a third example embodiment.

Next, an antenna angle adjustment device 20 in a third example embodiment is described with reference to the drawings. FIG. 8 is a block diagram illustrating a configuration example of the antenna angle adjustment device 20 in the third example embodiment. As illustrated in FIG. 8, the antenna angle adjustment device 20 in the third example embodiment includes an electric field strength calculation unit 21, an electric field strength measurement unit 22, and a comparison unit 23.

The electric field strength calculation unit 21 and the comparison unit 23 are equivalent to, for example, the direction adjustment determination unit 204 in the first example embodiment illustrated in FIG. 2.

The electric field strength measurement unit 22 is equivalent to, for example, the reception quality measurement unit 202 in the first example embodiment illustrated in FIG. 2.

Based on a distance between one antenna (e.g., the antenna 210 illustrated in FIG. 1) and another antenna (e.g., the antenna 310 illustrated in FIG. 1), the electric field strength calculation unit 21 calculates electric field strength when a direct wave of a radio wave radiated by the another antenna is received by the one antenna.

The electric field strength measurement unit 22 measures the electric field strength of the radio wave radiated by the another antenna being received by the one antenna.

The comparison unit 23 compares a calculation result by the electric field strength calculation unit 21 with a measurement result by the electric field strength measurement unit 22.

According to the present example embodiment, whether a direct wave or a reflected wave is transmitted and received is able to be appropriately determined by comparing electric field strength calculated based on a distance between one antenna and another antenna, with measured electric field strength.

Therefore, an angle of the one antenna, and an angle at which the another antenna is directed are able to be each adjusted to a more appropriate angle.

Example Embodiment 4

Figure 9:
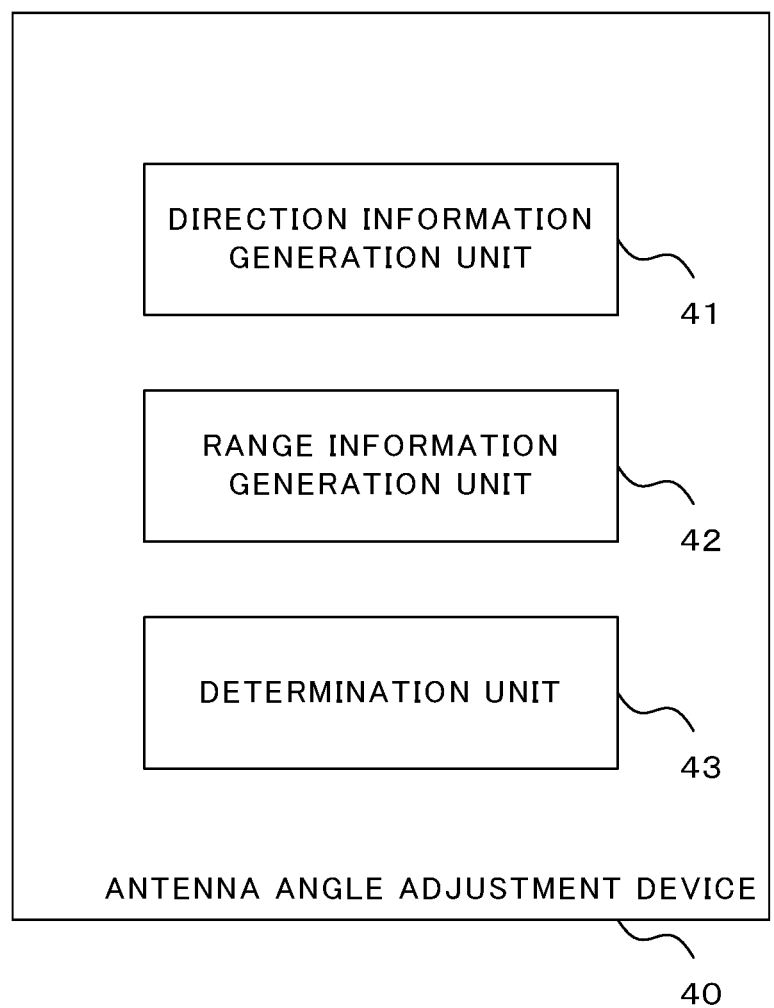
FIG. 9 is a block diagram illustrating a configuration example of an antenna angle adjustment device in a fourth example embodiment.

Next, an antenna angle adjustment device 40 in a fourth example embodiment is described with reference to the drawings. FIG. 9 is a block diagram illustrating a configuration example of the antenna angle adjustment device 40 in the fourth example embodiment. As illustrated in FIG. 9, the antenna angle adjustment device 40 in the fourth example embodiment includes a direction information generation unit 41, a range information generation unit 42, and a determination unit 43.

The direction information generation unit 41 is equivalent to, for example, the reception information acquisition unit 223 in the second example embodiment illustrated in FIG. 5.

The range information generation unit 42 and the determination unit 43 are equivalent to, for example, the direction adjustment determination unit 224 in the second example embodiment illustrated in FIG. 5.

The direction information generation unit 41 generates direction information indicating a direction of one antenna (e.g., the antenna 210 illustrated in FIG. 6) from another antenna (e.g., the antenna 310 illustrated in FIG. 6).

The range information generation unit 42 generates range information indicating a range of a main beam of the another antenna.

The determination unit 43 determines, based on the range information and the direction information, whether or not the one antenna is in a range indicated by the range information.

According to the present example embodiment, whether a direct wave or a reflected wave is transmitted and received is able to be appropriately determined by determining, based on a direction of one antenna from another antenna, and a range of a main beam of the another antenna, whether or not a direction in which the another antenna is directed is proper.

Therefore, an angle at which the another antenna is directed is able to be adjusted to a more appropriate angle.

Example Embodiment 5

Figure 10:
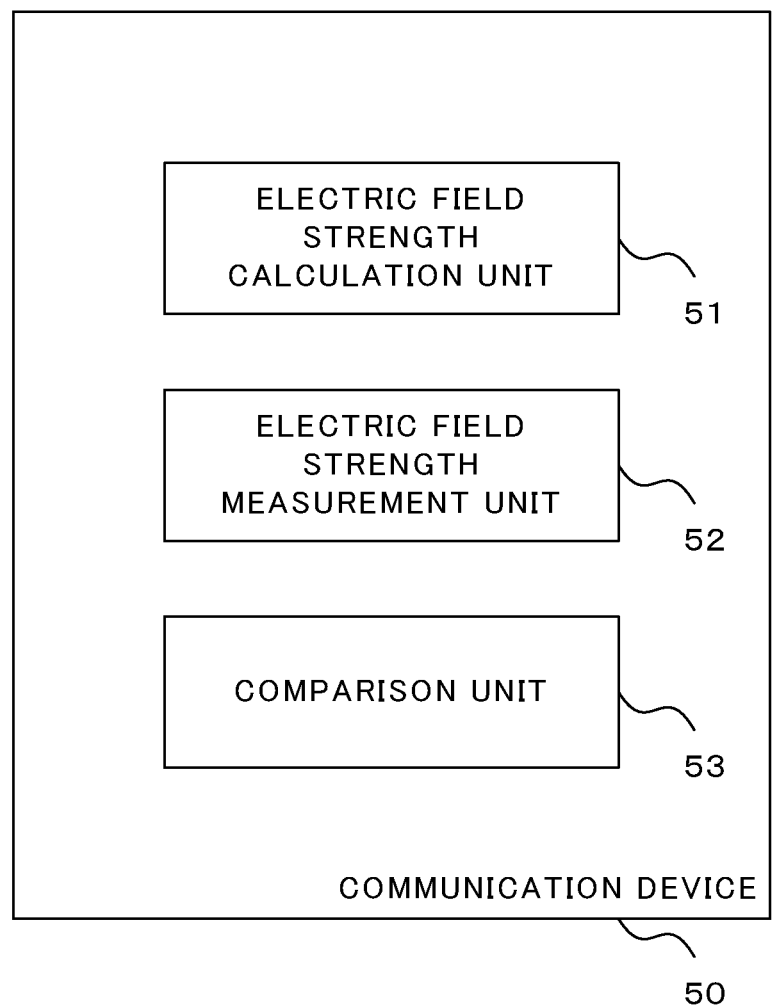
FIG. 10 is a block diagram illustrating a configuration example of a communication device in a fifth example embodiment.

Next, a communication device 50 in a fifth example embodiment is described with reference to the drawings. FIG. 10 is a block diagram illustrating a configuration example of the communication device 50 in the fifth example embodiment. As illustrated in FIG. 10, the communication device 50 in the fifth example embodiment includes an electric field strength calculation unit 51, an electric field strength measurement unit 52, and a comparison unit 53.

The electric field strength calculation unit 51 and the comparison unit 53 are equivalent to, for example, the direction adjustment determination unit 204 in the first example embodiment illustrated in FIG. 2.

The electric field strength measurement unit 52 is equivalent to, for example, the reception quality measurement unit 202 in the first example embodiment illustrated in FIG. 2.

Based on a distance between connected one antenna (e.g., the antenna 210 illustrated in FIG. 1) and another antenna (e.g., the antenna 310 illustrated in FIG. 1) connected to an opposite communication device (e.g., the adjustment device 300 illustrated in FIG. 1), the electric field strength calculation unit 51 calculates electric field strength when a direct wave of a radio wave radiated by the another antenna is received by the one antenna.

The electric field strength measurement unit 52 measures the electric field strength of the radio wave radiated by the another antenna and received by the one antenna.

The comparison unit 53 compares a calculation result by the electric field strength calculation unit 51 with a measurement result by the electric field strength measurement unit 52.

According to the present example embodiment, whether a direct wave or a reflected wave is transmitted and received is able to be appropriately determined by comparing electric field strength calculated based on a distance between one antenna and another antenna, with measured electric field strength.

Therefore, an angle of the one antenna, and an angle at which the another antenna is directed are able to be each adjusted to a more appropriate angle.

Example Embodiment 6

Figure 11:
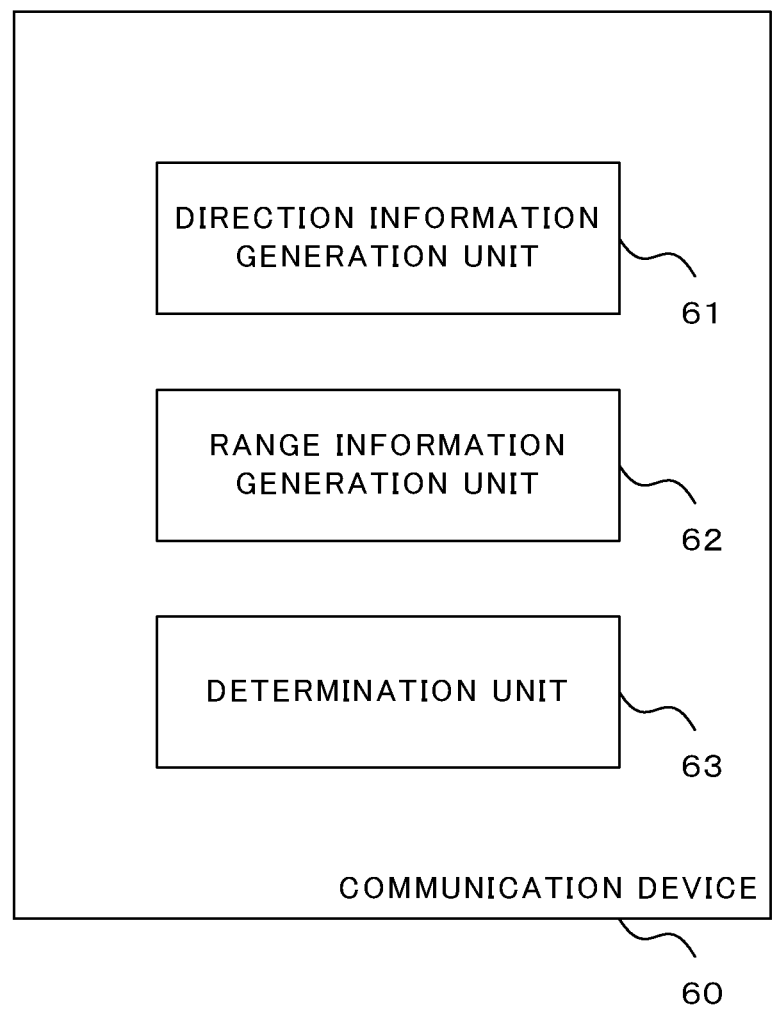
FIG. 11 is a block diagram illustrating a configuration example of a communication device in a sixth example embodiment.

Next, a communication device 60 in a sixth example embodiment is described with reference to the drawings. FIG. 11 is a block diagram illustrating a configuration example of the communication device 60 in the sixth example embodiment. As illustrated in FIG. 11, the communication device 60 in the sixth example embodiment includes a direction information generation unit 61, a range information generation unit 62, and a determination unit 63.

The direction information generation unit 61 is equivalent to, for example, the reception information acquisition unit 223 in the second example embodiment illustrated in FIG. 5.

The range information generation unit 62 and the determination unit 63 are equivalent to, for example, the direction adjustment determination unit 224 in the second example embodiment illustrated in FIG. 5.

The direction information generation unit 61 generates direction information indicating a direction of connected one antenna (e.g., the antenna 210 illustrated in FIG. 6) from another antenna (e.g., the antenna 310 illustrated in FIG. 6) connected to an opposite communication device (e.g., the adjustment device 300 illustrated in FIG. 1).

The range information generation unit 62 generates range information indicating a range of a main beam of the another antenna.

The determination unit 63 determines, based on the range information and the direction information, whether or not the one antenna is in a range indicated by the range information.

According to the present example embodiment, whether a direct wave or a reflected wave is transmitted and received is able to be appropriately determined by determining, based on a direction of one antenna from another antenna, and a range of a main beam of the another antenna, whether or not a direction in which the another antenna is directed is proper.

Therefore, an angle at which the another antenna is directed is able to be adjusted to a more appropriate angle.

The whole or part of the example embodiments disclosed above can be described as, but not limited to, the following supplementary notes.

(Supplementary Note 1)

An antenna angle adjustment device comprising:

electric field strength calculation means for calculating, based on a distance between one antenna and another antenna, electric field strength when a direct wave of a radio wave radiated by the another antenna is received by the one antenna;

electric field strength measurement means for measuring the electric field strength of the radio wave radiated by the another antenna, the radio wave being received by the one antenna; and comparison means for comparing a calculation result by the electric field strength calculation means with a measurement result by the electric field strength measurement means.

(Supplementary Note 2)

The antenna angle adjustment device according to Supplementary Note 1, wherein the comparison means compares the calculation result by the electric field strength calculation means with electric field strength of a radio wave radiated by the one antenna, the radio wave being received by the another antenna.

(Supplementary Note 3)

The antenna angle adjustment device according to Supplementary Note 1 or 2, wherein the comparison means compares the calculation result by the electric field strength calculation means with the measurement result by the electric field strength measurement means, and a value of electric field strength of the radio wave radiated by the one antenna, the radio wave being received by the another antenna.

(Supplementary Note 4)

The antenna angle adjustment device according to any one of Supplementary Notes 1 to 3, wherein the comparison means compares a difference between the calculation result by the electric field strength calculation means and a value indicated by the measurement result by the electric field strength measurement means, with a difference between the calculation result by the electric field strength calculation means and a value of electric field strength of a radio wave radiated by the one antenna, the radio wave being received by the another antenna.

(Supplementary Note 5)

The antenna angle adjustment device according to any one of Supplementary Notes 1 to 4, further comprising distance calculation means for calculating a distance between the one antenna and the another antenna, based on position information according to a position of the one antenna, and position information of the another antenna.

(Supplementary Note 6)

The antenna angle adjustment device according to any one of Supplementary Notes 1 to 5, further comprising:

measurement result information output means for outputting measurement result information indicating the measurement result by the electric field strength measurement means.

(Supplementary Note 7)

The antenna angle adjustment device according to any one of Supplementary Notes 1 to 6, further comprising:

comparison result information output means for outputting comparison result information indicating a result of the comparison.

(Supplementary Note 8)

An antenna angle adjustment system comprising:

the antenna angle adjustment device according to any one of Supplementary Notes 1 to 7; and an antenna angle adjustment compliant device comprising reception-side electric field strength measurement means being connected to the another antenna, for measuring electric field strength of a radio wave radiated by the one antenna, the radio wave being received by the another antenna, and transmission means for transmitting reception-side measurement result information indicating a measurement result by the reception-side electric field strength measurement means, wherein the antenna angle adjustment device comprises reception means for receiving the reception-side measurement result information transmitted by the transmission means.

(Supplementary Note 9)

An antenna angle adjustment device comprising:

direction information generation means for generating direction information indicating a direction of one antenna from another antenna;

range information generation means for generating range information indicating a range of a main beam of the another antenna; and determination means for determining, based on the range information and the direction information, whether or not the one antenna is in the range indicated by the range information.

(Supplementary Note 10)

The antenna angle adjustment device according to Supplementary Note 9, wherein the direction information generation means generates direction information indicating the direction of the one antenna from the another antenna, based on a position indicated by position information according to the one antenna, and a position indicated by position information according to the another antenna.

(Supplementary Note 11)

The antenna angle adjustment device according to Supplementary Note 9 or 10, wherein the range information includes information indicating a range of a half value width around a direction in which the another antenna is directed, and information indicating a direction in which the another antenna is directed.

(Supplementary Note 12)

The antenna angle adjustment device according to any one of Supplementary Notes 9 to 11, further comprising determination result information output means for outputting determination result information indicating a result of the determination.

(Supplementary Note 13)

An antenna angle adjustment method comprising:

an electric field strength calculation step of calculating, based on a distance between one antenna and another antenna, electric field strength when a direct wave of a radio wave radiated by the another antenna is received by the one antenna;

an electric field strength measurement step of measuring the electric field strength of the radio wave radiated by the another antenna, the radio wave being received by the one antenna; and a comparison step of comparing calculated electric field strength with measured electric field strength.

(Supplementary Note 14)

An antenna angle adjustment method comprising:

a direction information generation step of generating direction information indicating a direction of one antenna from another antenna;

a range information generation step of generating range information indicating a range of a main beam of the another antenna; and a determination step of determining, based on the range information and the direction information, whether or not the one antenna is in the range indicated by the range information.

(Supplementary Note 15)

A communication device comprising:

electric field strength calculation means for calculating, based on a distance between connected one antenna and another antenna connected to an opposite communication device, electric field strength when a direct wave of a radio wave radiated by the another antenna is received by the one antenna;

electric field strength measurement means for measuring the electric field strength of the radio wave radiated by the another antenna, the radio wave being received by the one antenna; and comparison means for comparing a calculation result by the electric field strength calculation means with a measurement result by the electric field strength measurement means.

(Supplementary Note 16)

A communication device comprising:

direction information generation means for generating direction information indicating a direction of connected one antenna from another antenna connected to an opposite communication device;

range information generation means for generating range information indicating a range of a main beam of the another antenna; and determination means for determining, based on the range information and the direction information, whether or not the one antenna is in the range indicated by the range information.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

REFERENCE SIGNS LIST 20, 40, 60 Antenna angle adjustment device
21, 51 Electric field strength calculation unit
22, 52 Electric field strength measurement unit
23, 53 Comparison unit
43, 63 Determination unit
41 Direction information generation unit
42 Range information generation unit
50, 60 Communication device
100 Adjustment system
200, 220, 300, 320 Adjustment device
201 Reception unit
202, 302 Reception quality measurement unit
203, 223 Reception information acquisition unit
204, 224 Direction adjustment determination unit
205 Position information generation unit
206 Display unit
207, 227 Direction adjustment information generation unit
208, 308 Transmission unit
229 Antenna angle detection unit
210, 310 Antenna

The invention claimed is:

1. An antenna angle adjustment device comprising:
   a direction information generator that generates direction information indicating a direction of one antenna from another antenna;
   a range information generator that generates range information indicating a range of a main beam of the another antenna;
   a distance calculator that calculates a distance between the one antenna and the another antenna, based on position information according to a position of the one antenna, and position information according to a position of the another antenna; and
   a determiner that determines, based on a condition including the distance, the range information and the direction information, whether or not the one antenna is in the range indicated by the range information,
   wherein the range information includes information indicating a direction in which the another antenna is directed.

2. The antenna angle adjustment device according to claim 1, wherein
   the direction information generator generates direction information indicating the direction of the one antenna from the another antenna, based on the position indicated by the position information according to the one antenna, and the position indicated by the position information according to the another antenna.

3. The antenna angle adjustment device according to claim 1, wherein
   the range information includes information indicating a range of a half value width around a direction in which the another antenna is directed.

4. The antenna angle adjustment device according to claim 1, further comprising
   a determination result information outputter that outputs determination result information indicating a result of the determination.

5. An antenna angle adjustment method comprising:
   generating direction information indicating a direction of one antenna from another antenna;
   generating range information indicating a range of a main beam of the another antenna;
   calculating a distance between the one antenna and the another antenna, based on position information according to a position of the one antenna, and position information of the another antenna; and
   determining, based on a condition including the distance, the range information and the direction information, whether or not the one antenna is in the range indicated by the range information,
   wherein the range information includes information indicating a direction in which the another antenna is directed.

6. A communication device comprising:
   a direction information generator that generates direction information indicating a direction of one antenna connected to the communication device from another antenna connected to an opposite communication device;
   a range information generator that generates range information indicating a range of a main beam of the another antenna;
   a distance calculator that calculates a distance between the one antenna and the another antenna, based on position information according to a position of the one antenna, and position information of the another antenna; and
   a determiner that determines, based on a condition including the distance, the range information and the direction information, whether or not the one antenna is in the range indicated by the range information,
   wherein the range information includes information indicating a direction in which the another antenna is directed.

* * * * *